United States Patent [19]

Chen

[11] Patent Number: 5,483,583
[45] Date of Patent: Jan. 9, 1996

[54] PAY PHONE

[76] Inventor: Jyh-Rong Chen, Fl. 2, No. 86, Kung-Chuan Rd., Pain-Chiao City, Taipei County, Taiwan

[21] Appl. No.: 323,675

[22] Filed: Oct. 18, 1994

[51] Int. Cl.⁶ .............. H04M 17/00; G07F 1/04; G07F 5/00; G07F 11/00
[52] U.S. Cl. .............. 379/146; 379/150; 379/153; 379/155; 194/247; 194/256; 194/302; 194/344; 194/346
[58] Field of Search ............. 199/344, 256, 199/294, 253, 297, 396, 247, 334, 239, 229, 261, 268, 302; 375/143, 145, 147, 146, 148, 149, 150, 151, 152, 153, 155

[56] References Cited

U.S. PATENT DOCUMENTS

| | | | |
|---|---|---|---|
| 4,899,371 | 2/1990 | Su | 379/146 |
| 4,984,670 | 1/1991 | Merkle | 194/334 X |
| 4,991,202 | 2/1991 | Su | 379/146 |
| 5,040,658 | 8/1991 | LeVasseur | 194/346 |

Primary Examiner—Stephen Chin
Assistant Examiner—Paul Loomis
Attorney, Agent, or Firm—Morton J. Rosenberg; David I. Klein

[57] ABSTRACT

A coin transmission control mechanism for a pay phone, including a plurality of projecting rods and slots below the projecting rods, a control plate connected to the projecting rods and having an actuating strip extended out of the telephone body of the pay phone through a hole for guiding a coin during a call, a fixed element, a movable element positioned by a top spring on the fixed element and controlled by an induction coil, a return plate stopped at a sloping wall on the control plate, a control device having a stop bar disposed within the control plate to stop a coin from passing to the coin-box, the movable element being pulled downwards, when the induction coil is turned on, to move the stop bar away for letting a coin pass to the coin-box of the pay phone, the stop bar being forced back to its former position by the control plate through the return plate to stop a coin from passing to the coin-box.

1 Claim, 5 Drawing Sheets

PAY PHONE

BACKGROUND OF THE INVENTION

The present invention relates to pay phones, and relates more particularly to an improved coin transmission control mechanism for a pay phone.

Various pay phones are well-known, and used outdoors as well as indoors. Regular pay phones include two types, namely, the automatic pay phones and the manual-operated pay phones. An automatic pay phone is controlled by a 16KC exchange line signal to let coin pass to the coin-box for starting the call. A manual-operated pay phone is controlled by a switch to let coin pass to the coin-box for starting the call. An automatic pay phone is complicated in structure, therefore its cost is high.

SUMMARY OF THE INVENTION

It is one object of the present invention to provide a coin transmission mechanism for a pay phone which is simple in structure and inexpensive to manufacture. It is another object of the present invention to provide a coin transmission mechanism for a pay phone which can be automatically triggered by a 16KC exchange line to let the coin pass to the coin-box for starting the call. It is still another object of the present invention to provide a coin transmission mechanism for a pay phone which can be automatically triggered by the voice signal of the opponent party to let the coin pass to the coin-box for starting the call. It is still another object of the present invention to provide a coin transmission mechanism for a pay phone which consumes less power supply so that the receiving of a voice signal does not affect the communication.

DETAILED DESCRIPTION OF THE PREFERRED EMBODIMENT

Figure 1:
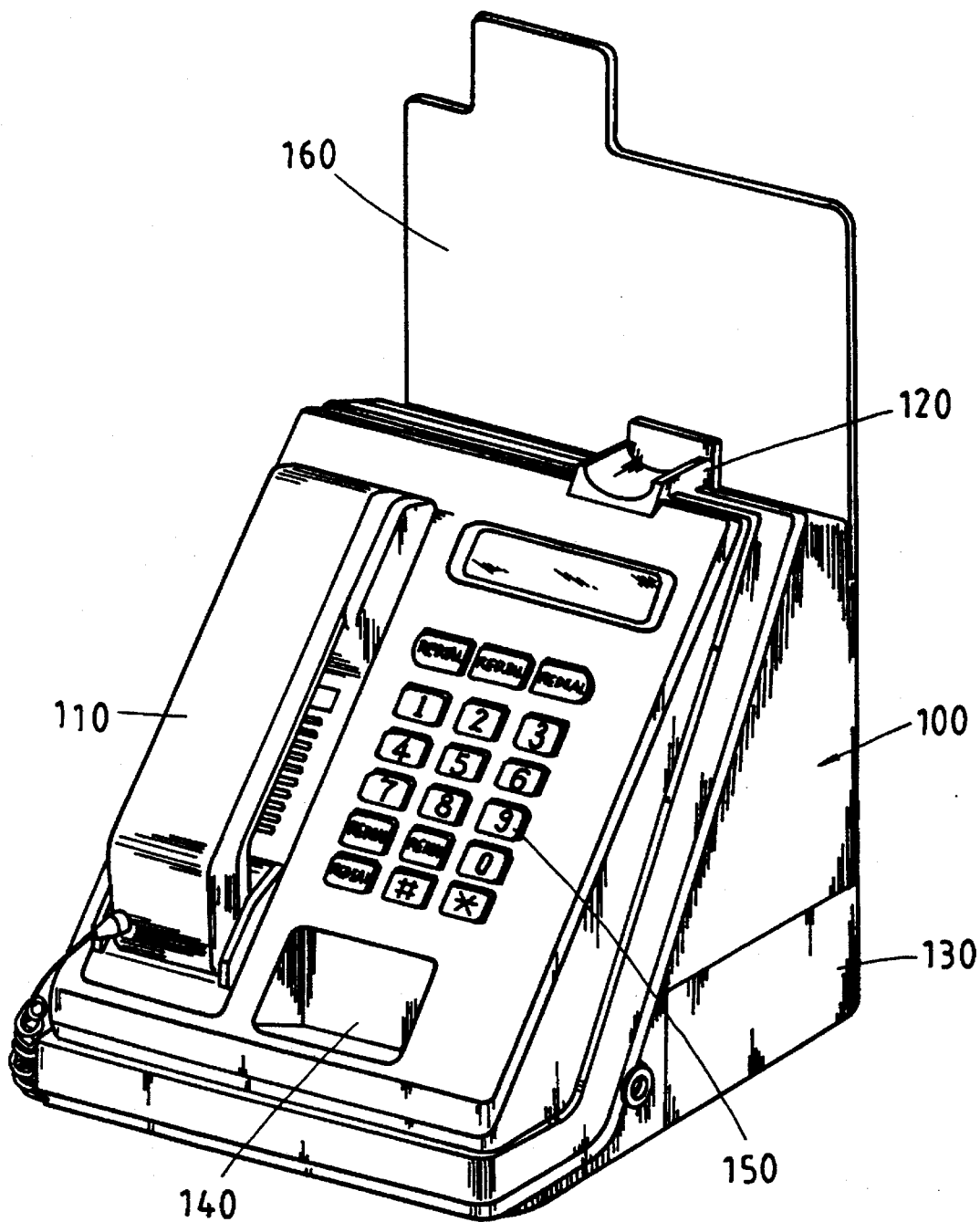
FIG. 1 is an elevational view of a pay phone according to the present invention.
Figure 2:
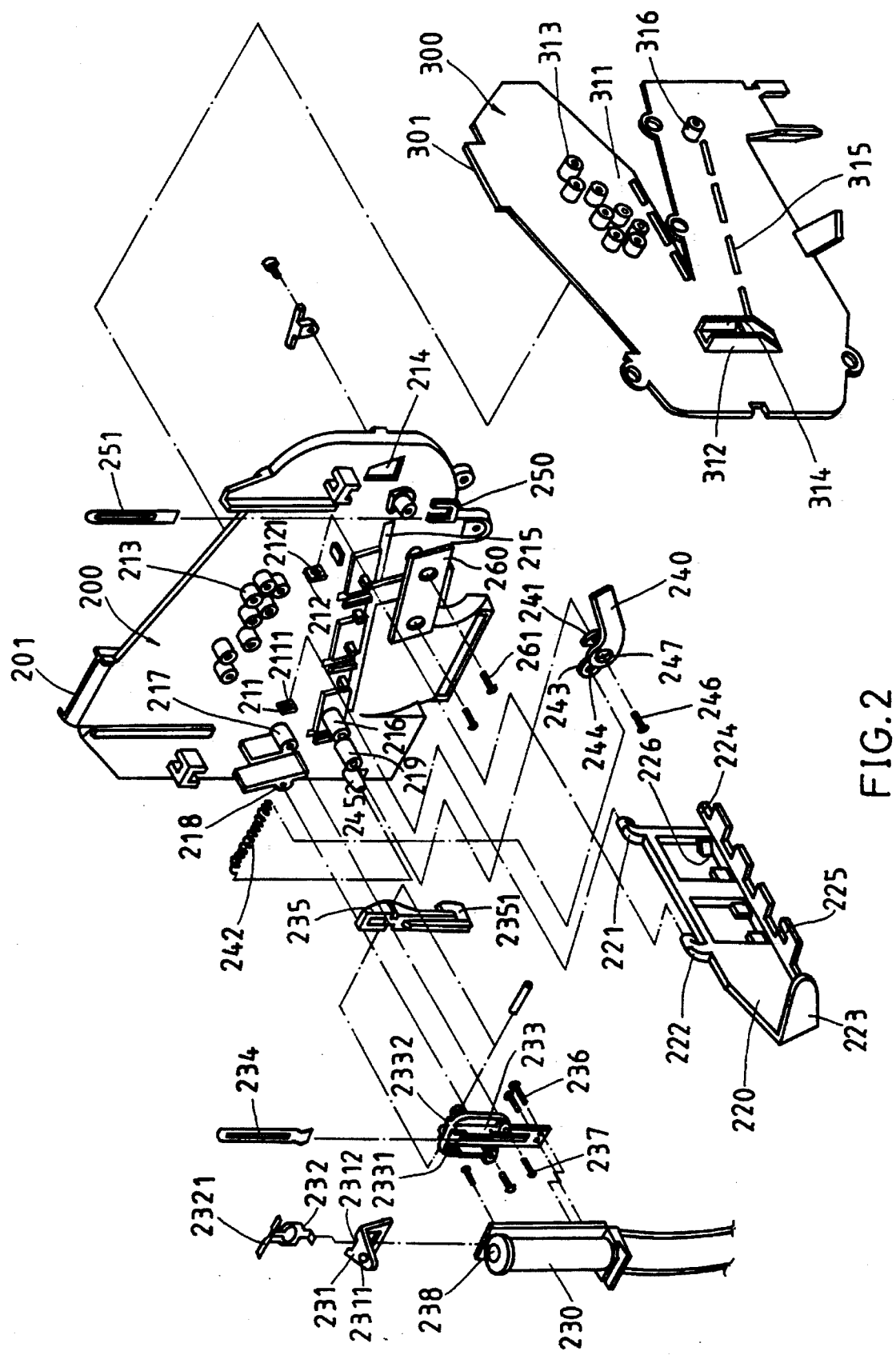
FIG. 2 is an exploded view of the coin transmission control mechanism for the pay phone shown in FIG. 1.
Figure 3:
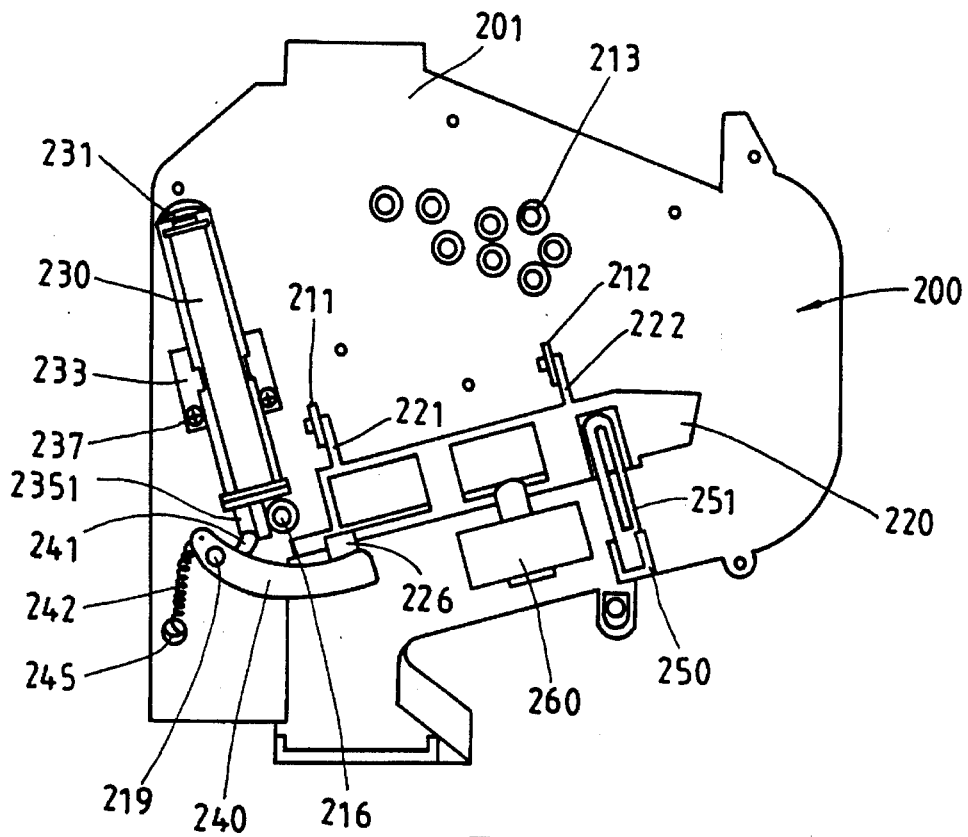
FIG. 3 is a back view in plain of the coin transmission control mechanism shown in FIG. 2, showing the press switch pressed.
Figure 4:
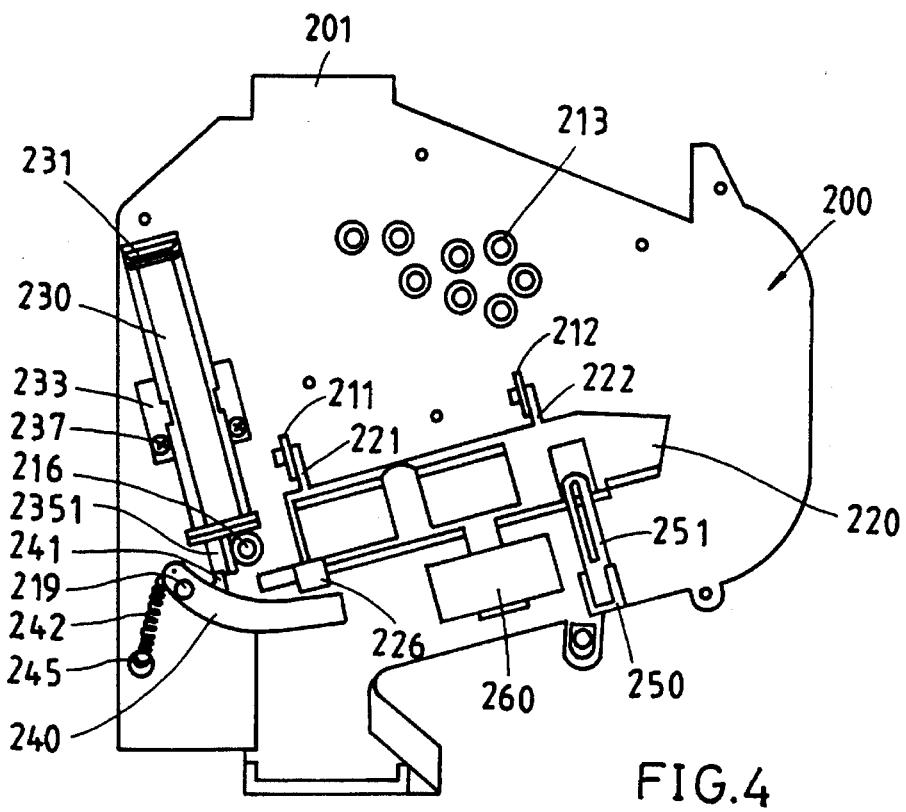
FIG. 4 is similar to FIG. 3 but showing the press switch released.
Figure 5:
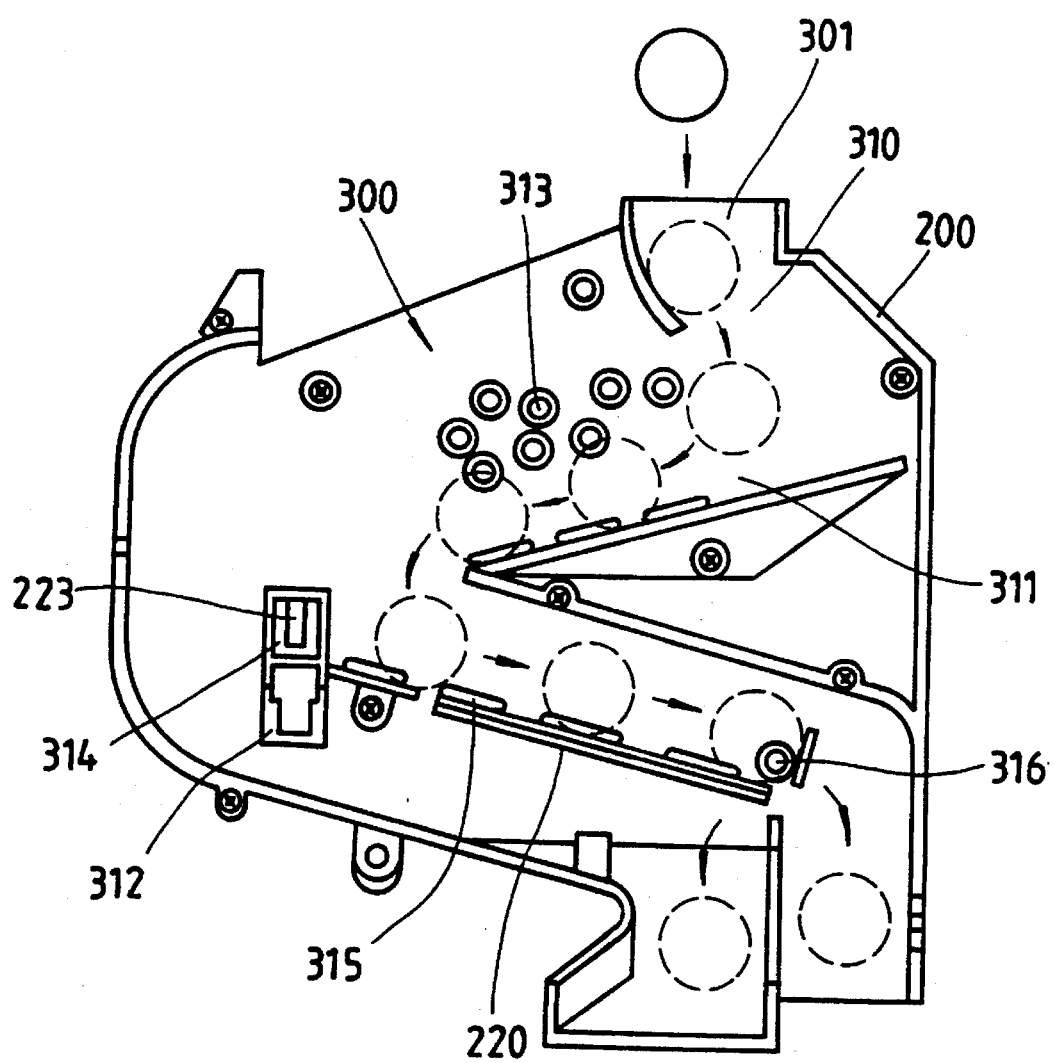
FIG. 5 shows the moving direction of the inserted coins in the coin transmission control mechanism of pay phone of FIG. 1.
Figure 6:
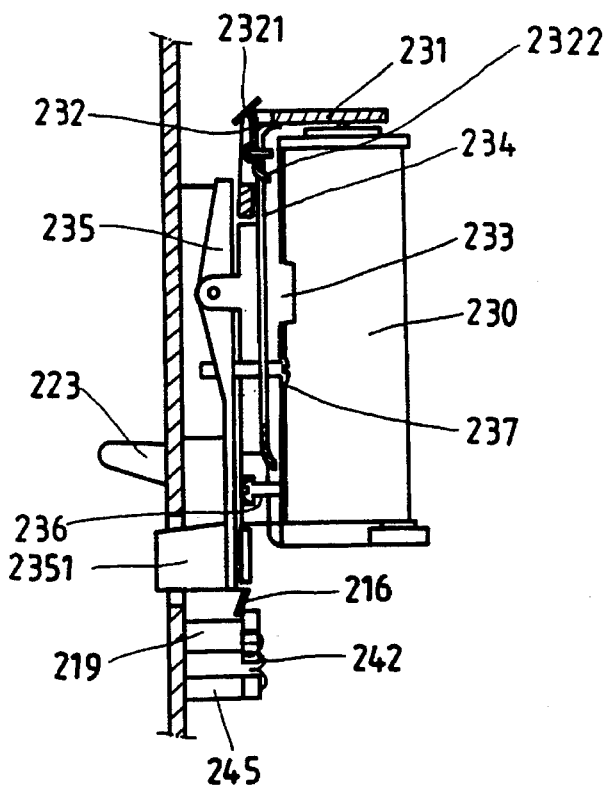
FIG. 6 shows the operation of the induction coil of the coin transmission control mechanism of the present invention (STEP I)
Figure 7:
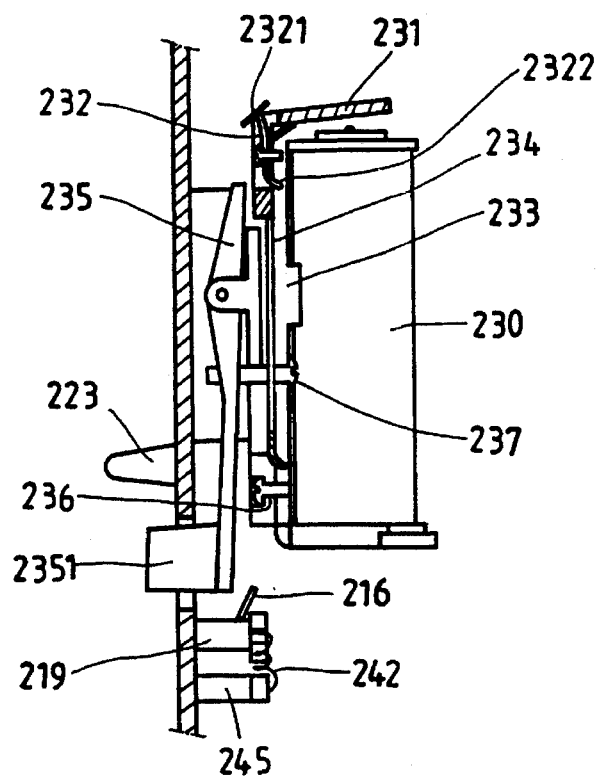
FIG. 7 shows the operation of the induction coil of the coin transmission control mechanism of the present invention (STEP II).

Referring to the annexed drawings in detail, a pay phone in accordance with the present invention is generally comprised of a telephone body 100, a handset 110, a coin slot 120, a coin-box 130, a coin-return assembly 140, push-button digits 150, a signboard 160, and a coin transmission control mechanism consisting of a front actuating unit 200 and a back actuating unit 300. The signboard 160 is fixed to the back side of the telephone body 100 for advertisement.

The front and back actuating units 200 and 300 are matched together, defining coin inlets 201 and 301 and coin tracks 210 and 310 extended from coin inlets 201 and 301. The tracks 210 and 310 define a 90° turn 311. A stop member 312 is disposed in the coil tracks 210 and 310 near the 90° turn 311 to stop inserted coins, permitting inserted coins to be guided downwards by a control plate 220 and guide rails 224 toward a stop bar 2351. A plurality of detector holders 213 and 313 are bilaterally disposed inside the tracks 210 and 310 above the 90° turn 311. The front actuating unit 200 comprises a plurality of projecting rods 211 and 212 with holes 2111 and 2121. The control plate 220 has pins 221 and 222 respectively fitted into the holes 2111 and 2121 on the projecting rods 211 and 212, and an actuating strip 223 inserted through a through hole 214 on the front actuating unit 200 and then extended out of the telephone body 100 through a through hole 314 on the stop member 312. When the handset 110 is hung up, the actuating strip 223 is forced to pull the control plate 220 backwards permitting the inserted coin to drop to the coin return assembly 140.

The guide rails 224 and the control plate 220 are integrally molded together and formed into a substantially L-shaped configuration. The guide rails 224 are respectively inserted through slots 215 on the front actuating unit 200 and respective slots 315 on the back actuating unit 300. The stop bar 2351 is made on the last guide rail 224. Detectors 216 and 316 are made on the front and back actuating units 200 and 300 at suitable locations near the stop bar 2351 to detect the existence of a coin, which is stopped by the stop bar 2351.

An induction coil 230 is provided to control a movable element 231, causing the top contact 2311 of the movable element 231 to contact or move away from a fixed contact 238, so as to control the action of letting the inserted coin drop to the coin-box 130. The movable element 231 is suspended on the top spring 2321 of a fixed element 232. The fixed element 232 has a bottom retainer portion 2322 inserted through a hole 2312 on the movable element 231 and fastened to a back groove 2331 on a support 233. The support 233 has a front groove 2332 coupled with a spring plate 234. The support 233 is fastened to a control device 235 and then fastened to the induction coil 230 by a screw 236. The induction coil 230 is then fastened to supports 217 and 218 on the front actuating unit 200 by screws 237. When the induction coil 230 is electrically connected, the top contact 2311 touches the fixed contact 238, causing the movable element 231 sucked down, and therefore the control device 235 is pulled downwards to carry the stop bar 2351 away from the coin tracks 210 and 310, permitting the inserted coin to drop to the coin-box 130.

A return plate 240 is provided having a projecting block 241 and a needle hole 244 near one end 243 thereof and a mounting hole 247 spaced from the needle hole 244. A spring 242 is provided having one end fixed to the needle hole 244 and an opposite end fastened to a locating pin 245 on the front actuating unit 200. The mounting hole 247 is fastened to a support 219 on the front actuating unit 200 by a screw 246. When installed, the return plate 240 is stopped at a sloping wall 226 on the control plate 220 and can be turned about the screw 246. When the handset 110 is hung up, the control plate 220 is forced backwards, causing the sloping wall 226 to turn the return plate 240 downwards. When the return plate 240 is turned downwards, the projecting block 241 is simultaneously moved downwards. At the same time, the stop bar 2351 of the control device 235 is returned to its former position by the spring plate 234 to stop the inserted coin.

A spring holder 250 is disposed below the actuating strip 223 to hold a return spring 251. When the handset 110 is picked up, the return spring 251 forces the control plate 220 into the slots 215 to provide a passage for the inserted coin.

A press switch 260 is fastened to the front actuating unit 200 by screws 261 and controlled manually or by a 16KC exchange line signal to trigger the induction coil 230 for letting the inserted coin in.

The main features of the present invention are the arrangement of the movable element 231, which is positioned by the top spring 2321 of the fixed element 232, and the arrangement of the control plate 220 and the return plate 240. Because the movable element 231 is positioned by the top spring 2321 of the fixed element 232, only a small amount of electric current is sufficient to drive the movable element 231, causing it to move the stop bar 2351 of the control device 235 for letting the inserted coin in. The sloping wall 226 of the control plate 220 is acted with the return plate 240 to return the stop bar 2351 to its former position with less labor.

When the front and back actuating units 200 and 300 are assembled, they are fixed to the telephone body 100 on the inside, permitting the coin inlets 201 and 301 to be aligned with the coin slot 120 and the coin return track 330 aligned with the coin return assembly 140, the coin reception track 30 aligned with the coin-box 130, the actuating strip 223 aimed at the handset 110.

What is claimed is:

1. A pay phone comprised of a telephone body, a handset, a coin slot, a coin-box, a coin-return assembly, push-button digits, a signboard, and a coin transmission control mechanism consisting of a front actuating unit and a back actuating unit, said transmission control mechanism being fixed to said telephone body on the inside by screws and having a coin inlet connected to said coin slot and a coin return track connected to said coin-return assembly and a coin reception track connected to said coin-box, wherein:

said front actuating unit comprises a plurality of projecting rods and slots below said projecting rods, a control plate connected to said projecting rods and having an actuating strip extended out of said telephone body through a hole for guiding a coin during a call, a fixed element, a movable element positioned by a top spring on said fixed element and controlled by an induction coil, a return plate stopped at a sloping wall on said control plate, a control device having a stop bar disposed within said control plate to stop a coin from passing to said coin-box, said movable element being pulled downwards, when said induction coil is turned on, to move said stop bar away for letting a coin pass to said coin-box, said stop bar being forced back to its former position by said control plate through said return plate to stop a coin from passing to said coin-box.

\* \* \* \* \*